United States Patent Office 3,479,141
Patented Nov. 18, 1969

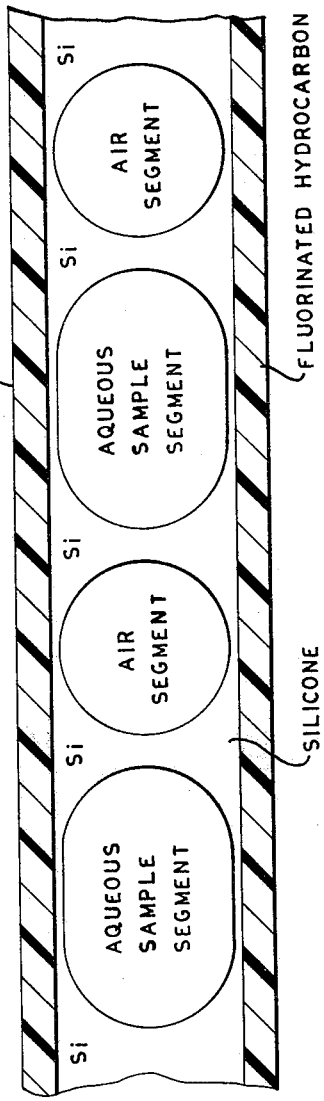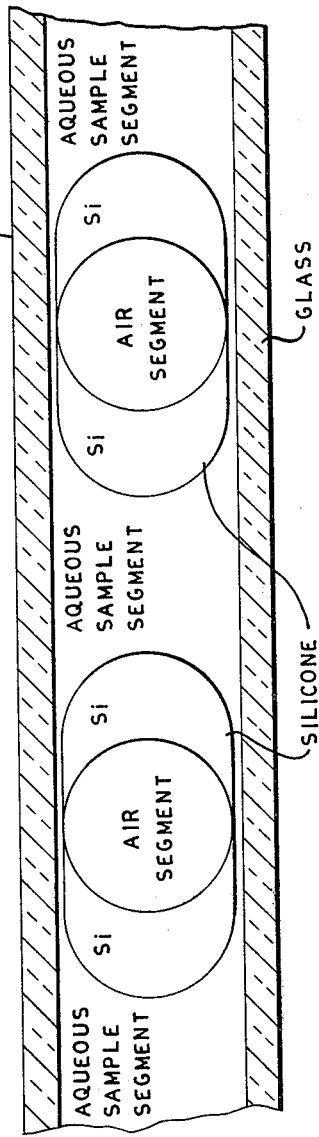

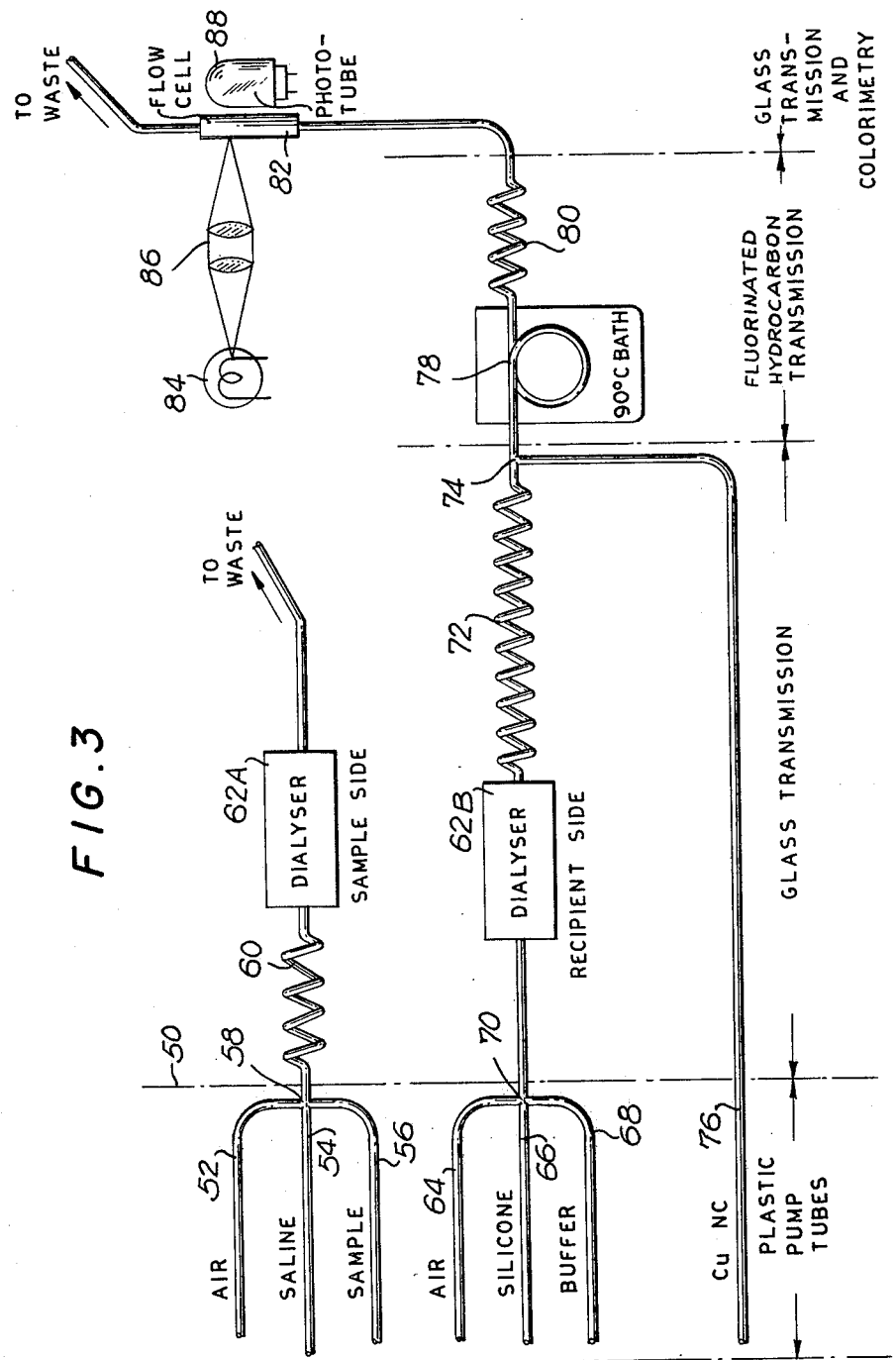

3,479,141
METHOD AND APPARATUS FOR ANALYSIS
William J. Smythe, Rye, and Morris H. Shamos, Bronx, N.Y., assignors to Technicon Corporation, Ardsley, N.Y., a corporation of New York
Continuation-in-part of application Ser. No. 542,488, Apr. 14, 1966. This application May 17, 1967, Ser. No. 639,100
Int. Cl. G01n 31/08
U.S. Cl. 23—230                                      14 Claims

ABSTRACT OF THE DISCLOSURE

A transport system for an automatic analysis apparatus for a series of aqueous liquid samples processed as a flowing stream with no or minimal contamination between samples is provided by a fluorinated hydrocarbon conduit and intersample segments of silicone. The silicone wets and adheres to the fluorinated hydrocarbon conduit, while the aqueous liquid samples do not so wet and adhere. Where wetting and contacting of the conduit by the samples is required, as in dialysis, glass and/or cellophane are used, which the aqueous liquid samples wet, and the silicone does not.

RELATED APPLICATIONS

This application is a continuation-in-part of our earlier application Ser. No. 542,488, filed Apr. 14, 1966, which is a continuation-in-part of our earlier application Ser. No. 369,695, filed May 25, 1964.

BACKGROUND OF THE INVENTION

Field of the invention

This invention relates to automatic analysis apparatus and especially to a system for transporting liquid samples sequentially as a flowing stream.

Description of the prior art

Automatic analysis apparatus for the analytical analysis of liquid samples as a flowing stream was disclosed by Leonard T. Skeggs in U.S. Patent No. 2,797,149 issued June 25, 1957, and in U.S. Patent No. 2,879,141 issued Mar. 24, 1959. In this basic apparatus, the liquid samples were sequentially aspirated from storage containers into a conduit, each sample being separated from the next successive sample by a segment of air. The flowing stream is treated, as by the addition of reagents, heating, dialysis, etc. to provide each sample with an optical density at a given wavelength which is indicative of the concentration of the constituent of interest. Customarily, the conduit is made of glass, rubber or polyvinylchloride. It has been found that the aqueous liquid samples wet the inner surface of such a conduit, causing a thin film of sample liquid to adhere thereto. This adhered liquid is, in part, taken up by the next successive liquid sample, which is thereby contaminated. Various expedients have been successfully utilized to reduce this intersample contamination. As taught in U.S. 2,879,141, supra, gas bubbles have been inserted into the flowing stream between successive samples, and in each sample. In U.S. 3,047,367 issued to Gerald Kessler on July 31, 1962, the use of liquid segments between successive samples is taught. In U.S. 3,134,263 issued to Eduard B. M. de Jong on May 26, 1964, the use of both gas and liquid segments between successive samples in taught. One function of these non-sample segments has been to take up between successive samples as much of the contaminating sample liquid which has adhered to the inner surface of the conduit as is possible.

SUMMARY OF THE INVENTION

It is an object of this invention to provide a sample transport system wherein no or minimal contamination between samples obtains. It is a further object to provide such a system which admits of processing steps wherein adherence of the sample liquid is required, such as in dialysis.

The invention resides in transporting a flowing stream of samples and intersample carrier segments of a liquid which is inert to and immiscible with said samples through a conduit having an inner surface of a material; utilizing a carrier liquid and a conduit inner surface material such that the carrier liquid has a contact angle with said conduit more closely approaching zero than the contact angle which the liquid samples have with said conduit; whereby said carrier liquid wets said inner surface of said conduit in preference to, and to the exclusion of, wetting of said inner surface of said conduit by the liquid samples.

These and other objects, features and advantages of this invention will be apparent from the following specification thereof taken in conjunction with the accompanying drawing in which:

FIG. 1 is a diagram showing a conduit made of fluorinated hydrocarbon through which pass aqueous liquid samples, carrier liquid segments and gas segments;

FIG. 2 is a diagram showing a conduit made of glass through which pass aqueous liquid samples, carrier liquid segments and gas segments; and FIG. 3 is flow diagram of a sample transport system embodying this invention.

DESCRIPTION OF THE PREFERRED EMBODIMENT

In FIG. 1 there is shown a conduit 10 made of a fluorinated hydrocarbon such as "Teflon." The term "wetting" is customarily interpreted as meaning that a particular liquid with respect to a particular surface adheres to such a surface; that the adhesion forces between the liquid and the surface are greater than the cohesion forces of the liquid; and that as the liquid flows along the surface its meniscus forms an angle to the surface approaching zero degrees. The term "non-wetting" is customarily interpreted as meaning that a particular liquid with respect to a particular surface does not adhere to such a surface; that the cohesion forces of the liquid are greater than the adhesion forces betwen the liquid and the surface; and that as the liquid flows along the surface its meniscus forms an angle to the surface greater than 90 degrees. It has been found that certain liquids, such as silicone, wet the inner wall of the fluorinated hydrocarbon conduit 10 and form a film thereon. The aqueous sample segments do not touch this inner wall of the conduit, but, rather, travel within the film of silicone. The aqueous sample segments do not adhere to the silicone film and thus do not leave a deposit of sample thereon, to contaminate successive sample segments. While the sample segments may mechanically displace a layer of the silicone film, this loss at any one point is immediately replenished by the silicone flowing in the stream.

An air, or other inert gas, segment is provided between sample segments. This gas segment also travels within the silicone film on the inner surface of the conduit. This gas segment has been found to be advantageous in use with silicones of high viscosity. Where only a silicone segment is disposed between adjacent sample segments, the silicone segments exhibit a tendency to slide past the sample segments, resulting in a coalescing of successive sample segments. The gas bubble has been found to be effective in precluding such slippage and coalescing.

In FIG. 2 there is shown a conduit 20 made of glass, cellophane, or other material which is normally wetted by water. Here the aqueous samples wet the inner wall of the conduit, and the silicone segments do not. Thus dialysis, which require the aqueous samples to wet the conduit, that is, a semipermeable membrane customarily made of cellulosic material, can be performed as usual. Contamination of successive samples does occur in this circumstance. The addition of a wetting agent, such as "Brij" to the samples, ensures that the aqueous samples will wet glass preferentially to silicone, and does not change the normal preferential wetting by the silicone compared to water of fluorinated hydrocarbon surfaces.

In FIG. 3 there is shown a flow system for an automatic analysis system utilizing the glucose neocuproine method and embodying this invention. The system here shown is made in part of glass conduit and in part of "Teflon" conduit. The contamination between samples of this system was compared to a similar system utilizing no "Teflon" and no silicone segmentation. A peristaltic type pump 50, having seven pump tubes made of polyvinylchloride, was used to advance fluids through the system. A pump tube 52 coupled to a source of air, a pump tube 54 coupled to a source of saline solution, and a pump tube 56 coupled to a sample supply device, not shown, but such as is shown in U.S. Patent No. 3,230,776 issued to Jack Isreeli et al. on Jan 25, 1966, are coupled to inlet of a junction 58, whose outlet is coupled to the inlet of a glass mixing coil 60, whose outlet is coupled to the inlet of the sample side 62A of a dialyzer, whose outlet discharges to waste. A pump tube 64 coupled to a source of air, a pump tube 66 coupled to a source of silicone and a pump tube 68 coupled to a source of buffer are coupled to the inlet of a junction 70, whose outlet is coupled to the inlet of the recipient side 62B of a dialyzer. The outlet of the dialyzer recipient side is coupled to the inlet of a glass mixing coil 72, whose outlet is coupled to one of the inlets of a junction 74. A pump tube 76 coupled to a source of CuNC is coupled to another inlet of the junction 74. The outlet of the junction 74 is coupled to the inlet of a ten foot "Teflon" 90° C. heating bath 78, whose outlet is coupled to the inlet of a "Teflon" horizontal mixing coil 80. The outlet of the mixing coil is coupled to the inlet of a glass flow cell 82, whose outlet discharges to waste. The optical density of the stream flowing through the flow cell is measured by the customary colorimetry system of light source 84, optical system 86, and photodetector 88.

In the non-"Teflon" manifold, in going from a sample having 300 mg. percent sugar to a sample having 50% sugar, a steady state condition was not yet detected by the photodetector after 90 seconds. In the "Teflon" manifold, with "Dow Silicone 200" and an air bubble, steady state was reached after 48 seconds, which provides 12 seconds of steady state sampling at 60 samples per hour. Thus, with the "Teflon"-silicone-air system there was no error when a sampling rate of 60 samples per hour was used. With the glass system, at a sampling rate of 60 samples per hour, there was a 5 to 10 mg. percent absolute or about 10% to 20% error.

It may be noted that the "Teflon"-silicone-air system successfully transmits blood serum with denatured or precipitated protein. Such solid protein will stick to glass and most other conduit materials.

An additional advantage of the "Teflon"-silicone-air system is its behavior at 90° C. The interfaces of air bubbles in glass and much more so in "Teflon," develop friction in such conduits. The total friction of the many interfaces between the liquid segments and the interior wall of the conduit provides a measurable pressure head in an analytical train. This causes surging in the stream due to the compressibility of air. To minimize this surging in "Teflon" coils with air segmentation, one means previously utilized was to artificially increase the exit pressure of the coil and repump at the output. Even in glass coils, it is useful to add a "pressure" coil after a heating bath. The "Teflon"-silicone-air combination, however, does not surge at 90° C. This is due to a lubricating effect of the silicone.

While we have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A method of transporting liquid samples through an automatic analysis apparatus as a flowing stream of seriatim samples, said method comprising:

spacing successive liquid samples apart by an intermediate carrier segment of a liquid which is inert to and immiscible with said samples;

transporting said flowing stream of samples and carrier segments through a conduit having an inner surface of a material;

wherein the improvement comprises:

utilizing a carrier liquid and a conduit inner surface material such that the carrier liquid has a contact angle with said conduit more closely approaching zero than the contact angle which the liquid samples have with said conduit;

whereby said carrier liquid wets said inner surface of said conduit in preference to, and to the exclusion of, wetting of said inner surface of said conduit by the liquid samples.

2. A method according to claim 1, the improvement further comprising:

providing at least two segments of said carrier liquid between successive liquid samples and spacing such segments apart by an intermediate segment of a gas which is inert to and immiscible with said carrier segments.

3. A method according to claim 1 wherein a step of said analysis includes the contacting of the liquid samples with a predetermined portion of the inner surface of the conduit, the improvement further comprising:

forming said predetermined portion of the inner surface of the conduit of a material such that the liquid samples have a contact angle with said predetermined portion more closely approaching zero than the contact angle which the carrier liquid has with said predetermined portion;

whereby said liquid samples wet said predetermined portion in preference to, and to the exclusion of, wetting of said predetermined portion by the carrier liquid.

4. A method according to claim 3 wherein said material of said predetermined portion of said inner surface of said conduit is glass.

5. A method according to claim 3 wherein said material of said predetermined portion of said inner surface of said conduit is cellophane.

6. A method according to claim 1 wherein said material of said inner surface of said conduit is a fluorinated hydrocarbon.

7. A method according to claim 1 wherein said carrier liquid is a silicone.

8. Automatic analysis apparatus for a plurality of liquid samples, comprising:

a conduit having an inlet and an outlet and an inner surface of a material;

supply means coupled to said inlet of said conduit for transmitting therethrough said plurality of liquid samples successively, and a carrier liquid which is inert to and immiscible with said samples, whereby successive liquid samples are spaced apart by an intermediate carrier liquid segment;

wherein the improvement comprises:

said carrier liquid and said conduit inner surface material being such that the carrier liquid has a contact angle with said conduit more closely approaching zero than the contact angle which the liquid samples have with said conduit;

whereby said carrier liquid wets said inner surface of said conduit in preference to, and to the exclusion of, wetting of said inner surface of said conduit by the liquid samples.

9. Apparatus according to claim 8, the improvement further comprising:

said supply means providing at least two segments of said carrier liquid between successive liquid samples and spacing such segments apart by an intermediate segment of a gas which is inert to and immiscible with said carrier segments.

10. Apparatus according to claim 8 wherein the contacting of the liquid samples with a predetermined portion of the inner surface of the conduit is required, the improvement further comprising:

said predetermined portion of the inner surface of the conduit being formed of a material such that the liquid samples have a contact angle with said predetermined portion more closely approaching zero than the contact angle which the carrier liquid has with said predetermined portion;

whereby said liquid samples wet said predetermined portion in preference to, and to the exclusion of, wetting of said predetermined portion by the carrier liquid.

11. Apparatus according to claim 10 wherein said material of said predetermined portion of said inner surface of said conduit is glass.

12. Apparatus according to claim 10 wherein said material of said predetermined portion of said inner surface of said conduit is cellophane.

13. Apparatus according to claim 8 wherein said material of said inner surface of said conduit is a fluorinated hydrocarbon.

14. Apparatus according to claim 8 wherein said carrier liquid is a silicone.

References Cited

UNITED STATES PATENTS

| | | | |
|---|---|---|---|
| 2,899,280 | 8/1959 | Whitehead et al. | 23—230 |
| 3,047,367 | 7/1962 | Kessler | 23—253 XR |
| 3,134,263 | 5/1964 | De Jong. | |
| 3,165,693 | 1/1965 | Isreeli et al. | 23—253 |

MORRIS O. WOLK, Primary Examiner

R. E. SERWIN, Assistant Examiner

U.S. Cl. X.R.

23—253; 73—423